(12) United States Patent
Shpigelman et al.

(10) Patent No.: US 9,174,287 B2
(45) Date of Patent: Nov. 3, 2015

(54) ROTARY CUTTING TOOL HAVING A PREDETERMINED NUMBER OF LEFT AND RIGHT HANDED HELICAL FLUTES AND END FACE CUTTING TEETH

(71) Applicant: Iscar, Ltd., Tefen (IL)

(72) Inventors: Leonid Shpigelman, Carmiel (IL); Igor Segal, Maalot (IL)

(73) Assignee: Iscar, Ltd., Tefen (IL)

( * ) Notice: Subject to any disclaimer, the term of this patent is extended or adjusted under 35 U.S.C. 154(b) by 246 days.

(21) Appl. No.: 14/092,634

(22) Filed: Nov. 27, 2013

(65) Prior Publication Data

US 2015/0147127 A1 May 28, 2015

(51) Int. Cl.
*B23C 5/00* (2006.01)
*B23C 5/10* (2006.01)

(52) U.S. Cl.
CPC .......... *B23C 5/10* (2013.01); *B23C 2210/0492* (2013.01); *B23C 2210/203* (2013.01); *B23C 2210/207* (2013.01); *B23C 2210/287* (2013.01); *B23C 2210/40* (2013.01); *B23C 2226/37* (2013.01); *B23C 2240/32* (2013.01)

(58) Field of Classification Search
CPC .............. B23C 5/04; B23C 5/10; B23C 5/32; B23C 5/37; B23C 5/40; B23C 5/54; B23C 5/088; B23C 5/323; B23C 5/1009
See application file for complete search history.

(56) References Cited

U.S. PATENT DOCUMENTS

| | | | | |
|---|---|---|---|---|
| 2,855,657 A | * | 10/1958 | Erhardt | B23C 5/04 407/115 |
| 3,058,199 A | * | 10/1962 | Cave | B23C 5/10 144/218 |
| 3,548,476 A | * | 12/1970 | Cave | B23C 5/10 407/54 |
| 4,990,035 A | * | 2/1991 | Scheuch | B23C 5/10 407/29.13 |
| 6,234,725 B1 | * | 5/2001 | Campian | B23C 5/1009 407/54 |
| 7,090,442 B2 | * | 8/2006 | Ahrnkiel | B23C 5/10 407/29.12 |
| 8,277,152 B2 | | 10/2012 | Azegami | |

* cited by examiner

*Primary Examiner* — Will Fridie, Jr.
(74) *Attorney, Agent, or Firm* — Womble Carlyle Sandridge & Rice PLLC

(57) ABSTRACT

A rotary cutting tool, having a longitudinal axis, includes cutting and mounting portions. The cutting portion includes an end face surface and a peripheral surface extending therefrom. The peripheral surface includes respective pluralities of main and auxiliary flutes that extend helically with opposite hand about the longitudinal axis. The cutting portion includes a plurality of evenly circumferentially distributed end gashes and a plurality of end face cutting teeth. The number of main flutes and auxiliary flutes are different, each being wholly divisible by, and greater than, the number of end face cutting teeth. In each cross sectional view of the cutting portion an imaginary contour line defined by a peripheral contour of the peripheral surface of one of the end face cutting teeth is in rotationally aligned relationship, about the longitudinal axis, with the peripheral contour of the peripheral surfaces of all other end face cutting teeth.

29 Claims, 5 Drawing Sheets

ROTARY CUTTING TOOL HAVING A PREDETERMINED NUMBER OF LEFT AND RIGHT HANDED HELICAL FLUTES AND END FACE CUTTING TEETH

FIELD OF THE INVENTION

The subject matter of the present application relates to rotary cutting tools having left and right handed helical flutes and end face cutting teeth, in particular for performing cutting operations on composite laminated materials, such as fiberglass.

BACKGROUND OF THE INVENTION

A rotary cutting tool can be provided with left and right handed helical flutes recessed in a peripheral surface of the rotary cutting tool. An example of such a rotary cutting tool is disclosed in, for example, U.S. Pat. No. 6,234,725, where the left and right handed helical flutes intersect to form intersecting cutters (i.e. discrete peripheral cutting teeth).

In some other rotary cutting tools, the number of left handed helical flutes is different to the number of right handed helical flutes in order to avoid axial gaps in the cutting zone, as discussed in U.S. Pat. No. 4,990,035.

A rotary cutting tool can also be provided with end face cutting edges at a top portion thereof. An example of such rotary cutting tools is disclosed in, for example, U.S. Pat. No. 8,277,152.

SUMMARY OF THE INVENTION

In accordance with a first aspect of the subject matter of the present application, there is provided a rotary cutting tool, having a longitudinal axis about which the rotary cutting tool is rotatable in a direction of rotation, the rotary cutting tool comprising:

a cutting portion and a mounting portion extending therefrom, the cutting portion comprising:

an end face surface, intersected by the longitudinal axis, and a peripheral surface extending from the end face surface towards the mounting portion, the peripheral surface comprising respective pluralities of main and auxiliary flutes recessed therein that extend helically with opposite hand about the longitudinal axis;

a plurality of end face cutting teeth formed on the end face surface, each end face cutting tooth comprising an end tooth major surface that generally faces the direction of rotation, and an end cutting edge formed at the intersection of the end face surface and the end tooth major surface, each end face cutting tooth being defined between circumferentially adjacent end gashes, each of which end gashes interrupts an intersection of the peripheral surface with the end face surface at an associated one of the plurality of main flutes; wherein the number of main flutes and auxiliary flutes are different, each being wholly divisible by, and greater than, the number of end face cutting teeth;

the end gashes are evenly circumferentially distributed with respect to the main flutes; and in each cross sectional view of the cutting portion, taken perpendicular to the longitudinal axis through the end gashes, an imaginary contour line defined by a peripheral contour of the peripheral surface of one of the end face cutting teeth is in rotationally aligned relationship, about the longitudinal axis, with the peripheral contour of the peripheral surfaces of all other end face cutting teeth.

It is understood that the above-said is a summary, and that features described hereinafter may be applicable in any combination to the subject matter of the present application, for example, any of the following features may be applicable to the rotary cutting tool.

The main flutes are equally spaced apart. The auxiliary flutes are equally spaced apart.

Each end gash can extend circumferentially along the intersection of the end face surface and the peripheral surface, in the direction of rotation, and can interrupt exactly two adjacent main flutes along said intersection.

Each end gash can extend towards the mounting portion and can interrupt at least two auxiliary flutes on the peripheral surface.

Each end gash can interrupt exactly two auxiliary flutes on the peripheral surface.

Each end face cutting tooth can be defined axially at an end furthest from the mounting portion by the end face surface and radially by circumferentially adjacent end gashes.

Adjacent pairs of main and auxiliary flutes intersect on the peripheral surface to form discrete peripheral cutting teeth.

Each peripheral cutting tooth can comprise a main peripheral cutting edge formed at the intersection of the peripheral surface and the rotationally leading main flute of the adjacent pair of main flutes and an auxiliary peripheral cutting edge formed at the intersection of the peripheral surface and the rotationally leading auxiliary flute of the adjacent pair of auxiliary flutes.

A peripheral relief surface can extends between the main peripheral cutting edge and the auxiliary peripheral cutting edge on each peripheral cutting tooth.

The rotary cutting tool can be one selected from a group consisting of an end-mill cutter and a router bit.

The rotary cutting tool can comprise a unitary integral one-piece construction.

In each cross sectional view of the cutting portion taken perpendicular to the longitudinal axis but not through the end gashes, the cutting portion can exhibit N-fold rotational symmetry about the longitudinal axis, where N is equal to the greatest common divisor of the number of main flutes and the number of auxiliary flutes.

At least one of the end cutting edges can form an extended end cutting edge that extends to a radially central portion of the cutting portion, as seen in an end view of the rotary cutting tool taken along the longitudinal axis. In each cross sectional view of the cutting portion taken perpendicular to the longitudinal axis through the end gashes the cutting portion can have X equal tooth sectors where X is equal to number of end face cutting teeth minus the number of extended cutting edges.

The cutting portion can exhibit 180° rotational symmetry about the longitudinal axis.

The number of main and auxiliary flutes, respectively, can be greater than or equal to 4 and less than or equal to 24.

The number of end face cutting teeth can be greater than or equal to 2 and less than or equal to 8.

The number of main flutes can be greater than the number of auxiliary flutes.

The number of main flutes can be exactly three times the number of end face cutting teeth. The number of auxiliary flutes can be exactly twice the number of end face cutting teeth.

The number of end face cutting teeth can be 4. The number of main flutes can be 12. The number of auxiliary flutes can be 8.

The rotary cutting tool can be a right handed rotary cutting tool, the main flutes can be right handed helical flutes, and the auxiliary flutes can be left handed helical flutes, or the rotary cutting tool can be a left handed rotary cutting tool, the main flutes can be left handed helical flutes, and the auxiliary flutes can be right handed helical flutes.

The cutting portion can be generally cylindrical.

All the main flutes can be helically aligned about the longitudinal axis with a main flute helix having a main flute helix angle. All the auxiliary flutes can be helically aligned about the longitudinal axis with an auxiliary flute helix having an auxiliary flute helix angle. The main flute helix angle can be less than the auxiliary flute helix angle in absolute value.

The mounting portion can comprise a threaded portion.

In each cross sectional view of the cutting portion taken perpendicular to the longitudinal axis, all the main flutes can have an equal main flute depth, as measured in the radial direction.

Each of the main flutes and each of the auxiliary flutes can open out to the end face surface or one of the end gashes.

Each of the end gashes has a gash angle $\delta$, each gash angle $\delta$ can be in the range $30°<\delta<50°$.

Each end cutting edge can define a dish angle, as measured with respect to a dish plane that is oriented perpendicularly to the longitudinal axis.

The auxiliary core diameter defined by the auxiliary flutes can be greater than the main core diameter defined by the main flutes.

The peripheral surface of one of the end face cutting teeth is in rotationally aligned relationship, about the longitudinal axis, with the peripheral surface of all other end face cutting teeth.

BRIEF DESCRIPTION OF THE FIGURES

For a better understanding of the present application and to show how the same may be carried out in practice, reference will now be made to the accompanying drawings, in which.

Figure 1:
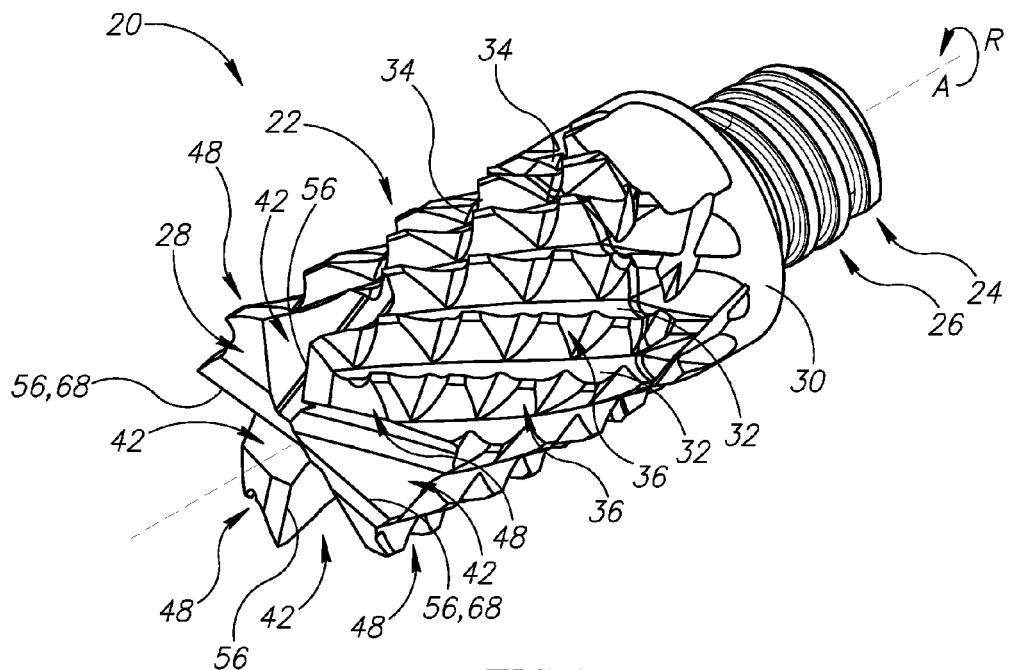
FIG. 1 is a perspective view of a rotary cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
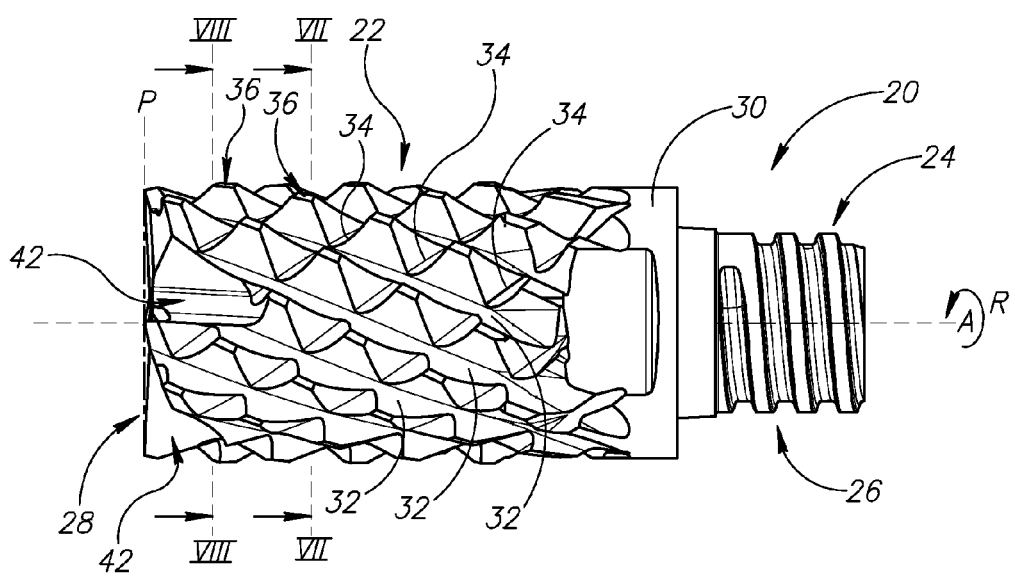
FIG. 2 is a side view of the rotary cutting tool in FIG. 1.

Attention is first drawn to FIGS. 1 and 2, showing a rotary cutting tool 20. The rotary cutting tool 20 can be one selected from a group consisting of an end-mill cutter and a router bit. The rotary cutting tool 20 can be used for ramp-down and helical interpolation cutting operations. The rotary cutting tool 20 can be used for the cutting of composite laminated material, such as fiberglass. In accordance with some embodiments of the subject matter of the present application, the rotary cutting tool 20 can be made from cemented carbide. The rotary cutting tool 20 can have a unitary integral one-piece construction. The cutting portion 22 can exhibit 180° rotational symmetry about the longitudinal axis A.

The rotary cutting tool 20 has a longitudinal axis A about which the rotary cutting tool 20 is rotatable in a direction of rotation R. The rotary cutting tool 20 has a cutting portion 22 and a mounting portion 24, which extends from the cutting portion 22, for releasably attaching the rotary cutting tool 20 to a complementary tool holder. As seen in FIGS. 1 and 2, in this non-limiting example, the mounting portion 24 can include a threaded portion 26 for threadingly engaging a corresponding holder threaded portion on the tool holder.

Figure 3:
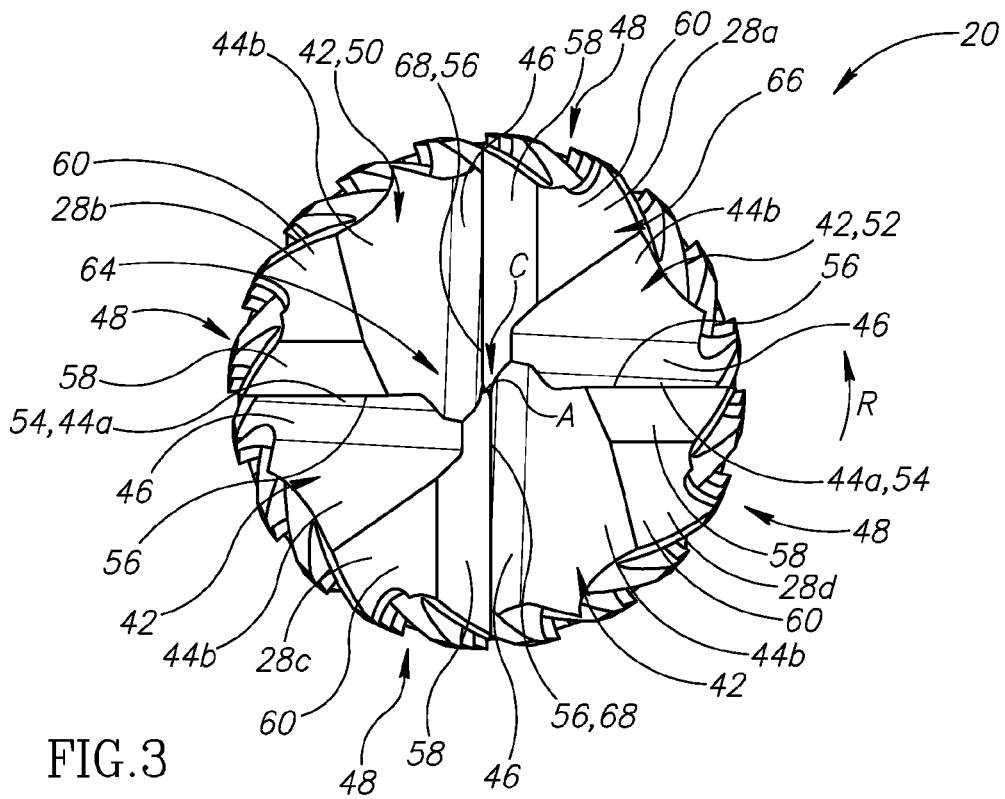
FIG. 3 is an end view of the rotary cutting tool in FIG. 1.
Figure 4:
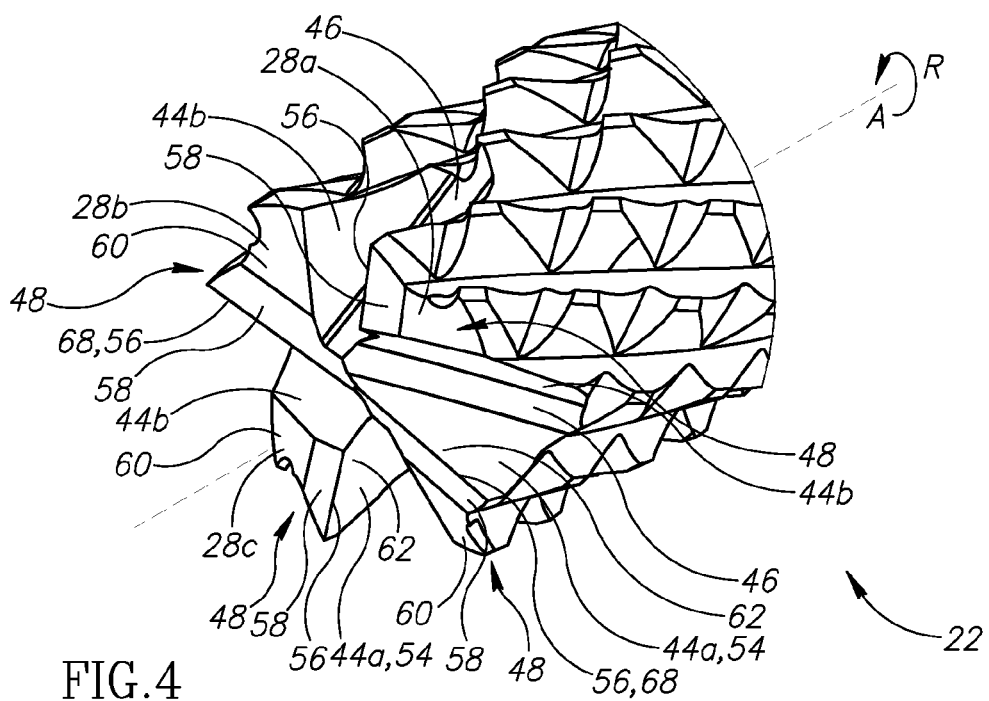
FIG. 4 is a detailed view of a cutting portion of the rotary cutting tool in FIG. 1.
Figure 5:
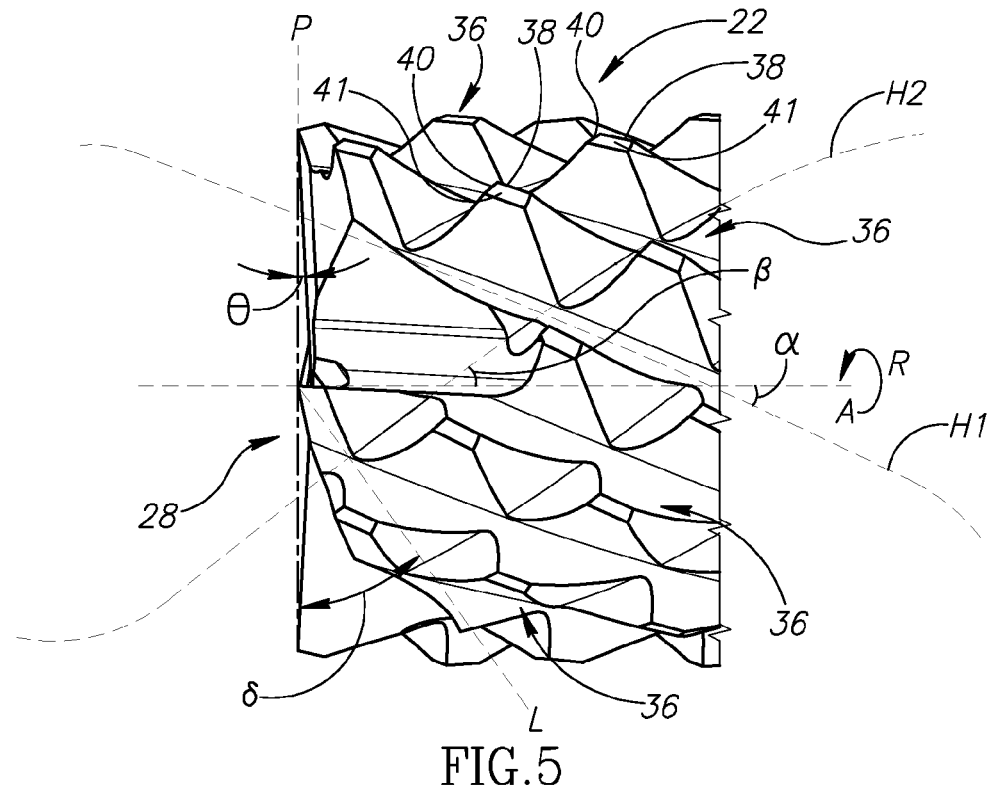
FIG. 5 is a detailed view of the cutting portion of the rotary cutting tool in FIG. 2.

Referring now to FIGS. 3 to 5, the cutting portion 22 includes an end face surface 28 intersected by the longitudinal axis A. The cutting portion 22 includes a peripheral surface 30 that extends from the end face surface 28 towards the mounting portion 24. In accordance with some embodiments of the subject matter of the present application the cutting portion 22 can have a generally cylindrical shape. Referring in particular to FIG. 3, the end face surface 28 can be formed by a plurality, for example four, end face sub-surfaces 28*a*, 28*b*, 28*c*, 28*d*.

The peripheral surface 30 includes a plurality of main flutes 32 and a plurality of auxiliary flutes 34 respectively recessed in the peripheral surface 30. The respective pluralities of main and auxiliary flutes 32, 34 extend helically with opposite hand about the longitudinal axis A. In accordance with some embodiments of the subject matter of the present application, all the main flutes 32 can be helically aligned about the longitudinal axis A with a main flute helix H1 that has a main flute helix angle $\alpha$. All the auxiliary flutes 34 can be helically aligned about the longitudinal axis A with an auxiliary flute helix H2 that has an auxiliary flute helix angle $\beta$. The main flute helix angle $\alpha$ can be less than the auxiliary flute helix angle $\beta$ in absolute value.

Figure 6A:
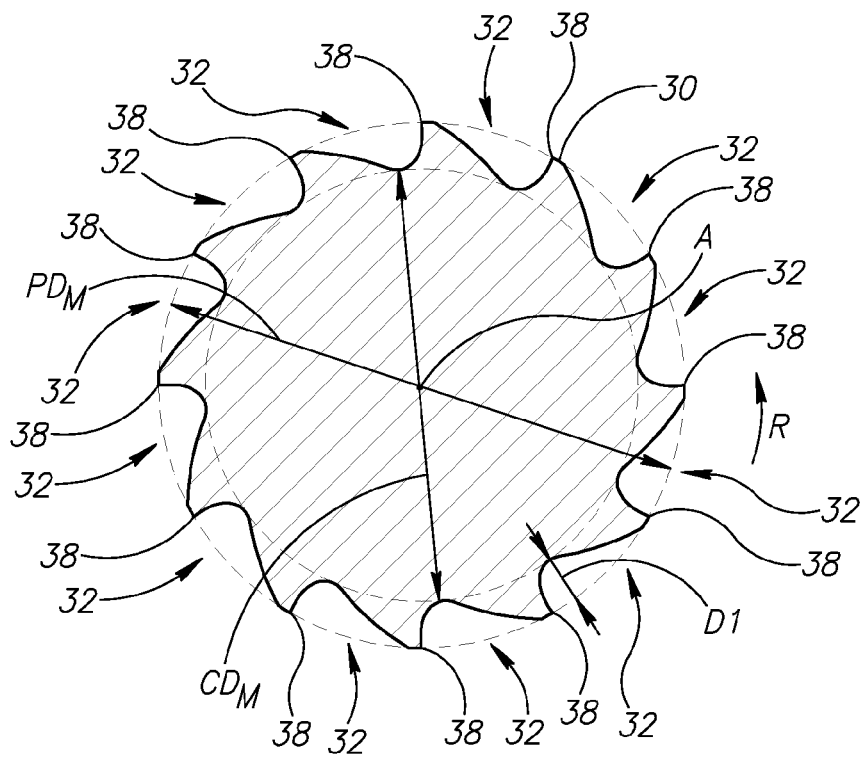
FIG. 6*a* is a cross sectional view of the cutting portion of the rotary cutting tool where only main flutes are shown, taken perpendicular to the longitudinal axis.

Referring now to FIG. 6*a*, showing a cross sectional view of the cutting portion 22 of the rotary cutting tool 20 where only the main flutes 32 are shown, the main flutes 32 are equally spaced apart. The main flutes 32 define a main core diameter $CD_M$ and a main peripheral diameter $PD_M$ associated with the outside diameter of the main peripheral cutting edges 38. In accordance with some embodiments of the subject matter of the present application, all the main flutes 32 can have an equal main flute depth D1, defined as the distance, measured in the radial direction, between two concentric circles associated with the main core diameter $CD_M$ and the outside diameter of the main peripheral cutting edges 38, respectively.

Figure 6B:
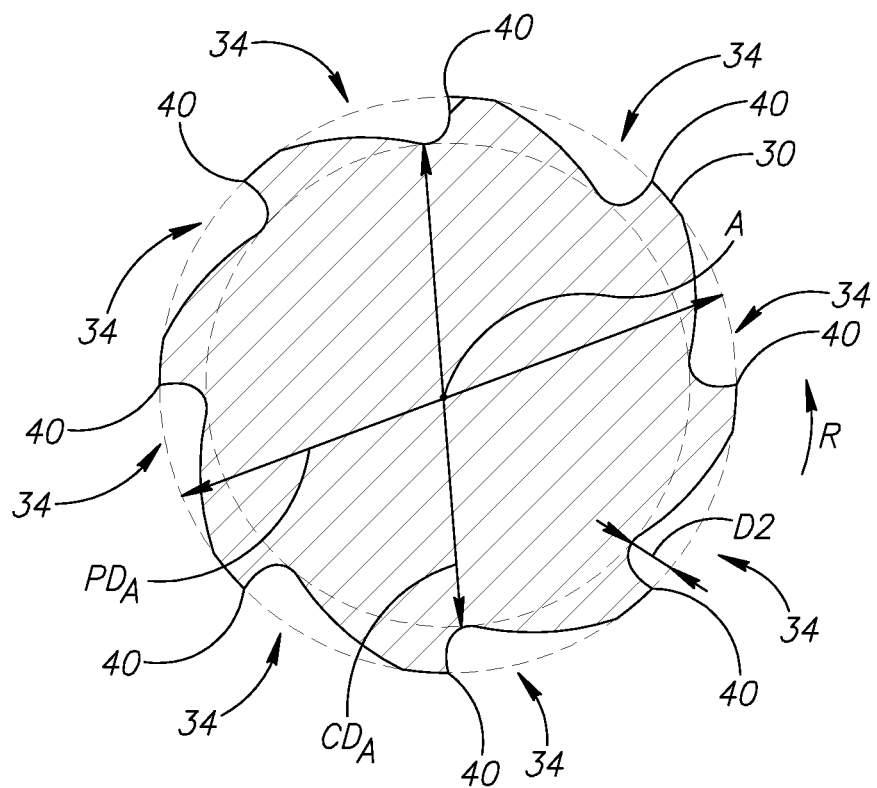
FIG. 6*b* is a cross sectional view of the cutting portion of the rotary cutting tool where only auxiliary flutes are shown, taken perpendicular to the longitudinal axis.

Referring now to FIG. 6b, showing a cross sectional view of the cutting portion 22 of the rotary cutting tool 20 where only the auxiliary flutes 34 are shown, the auxiliary flutes 34 are equally spaced apart. The auxiliary flutes 34 define an auxiliary core diameter $CD_A$ and an auxiliary peripheral diameter $PD_A$ associated with the outside diameter of the auxiliary peripheral cutting edges 40. In accordance with some embodiments of the subject matter of the present application, all the auxiliary flutes 34 can have an equal auxiliary flute depth D2, defined as the distance, measured in the radial direction, between two concentric circles associated with the auxiliary core diameter $CD_A$ and the outside diameter of the auxiliary peripheral cutting edges 40, respectively. The auxiliary core diameter $CD_A$ can be greater than the main core diameter $CD_M$. The main peripheral diameter $PD_M$ can be the same as the auxiliary peripheral diameter $PD_A$. The main flute depth D1 may be larger than the auxiliary flute depth D2, Referring to FIG. 2, adjacent pairs of main and auxiliary flutes 32, 34 intersect on the peripheral surface 30 to form discrete peripheral cutting teeth 36. Each peripheral cutting tooth 36 includes a main peripheral cutting edge 38 formed at the intersection of the peripheral surface 30 and the rotationally leading main flute 32 of the adjacent pair of main flutes 32. Each peripheral cutting tooth 36 includes an auxiliary peripheral cutting edge 40 formed at the intersection of the peripheral surface 30 and the rotationally leading auxiliary flute 34 of the adjacent pair of auxiliary flutes 34. A peripheral relief surface 41 can extend between the main peripheral cutting edge 38 and the auxiliary peripheral cutting edge 40 on each peripheral cutting tooth 36. It is known that peripheral cutting teeth 36 configured in accordance with the subject matter of the present application are beneficial for reducing delamination when performing cutting operations on composite laminated materials, such as, for example, fiberglass.

Referring now to FIGS. 3 to 5, the cutting portion 22 includes a plurality of end gashes 42. Gashes, referred to as end gashes in this specification, are known in the field of rotary cutting tools. Said gashes are notches that define a space for allowing the evacuation of chips away from a cutting region located at the end face surface 28 during axial cutting operations. Each end gash 42 interrupts the intersection of the peripheral surface 30 and the end face surface 28 at the main flute 32 with which the respective end gash 42 is associated. Stated differently, each end gash 42 extends across the intersection of the peripheral surface 30 and the end face surface 28 and opens out to the peripheral surface 30 and the end face surface 28 at an associated one of the plurality of main flutes 32.

The end gashes 42 are evenly circumferentially distributed, with respect to the main flutes 32. That is to say, every $M^{th}$ main flute 32 has an associated end gash 42 where M equals the number of main flutes 32 divided by the number of end gashes 42. For example, in the non-limiting example where there are 12 main flutes 32 and 4 end gashes 42, the end gashes 32 are formed at the first, fourth, seventh and tenth main flutes 32, respectively. Some of the main flutes 32 do not have an associated end gash 42.

Each end gash 42 includes a first gash side surface 44a. The first gash side surface 44a generally faces the direction of rotation R. It is noted that the first gash side surface 44a intersects the associated main flute 32. Each end gash 42 includes a second gash side surface 44b. The second gash side surface 44b faces generally opposite the first gash side surface 44a. In accordance with some embodiments of the subject matter of the present application, each end gash 42 can include a gash central surface 46 that extends between the first and second gash side surfaces 44a, 44b.

Each end gash 42 extends circumferentially along the intersection of the end face surface 28 and the peripheral surface 30, in the direction of rotation R, and can interrupt exactly two adjacent main flutes 32 along said intersection. It is noted that in the case when the end gash 42 interrupts more than one main flute 32 along the intersection of the end face surface 28 and the peripheral surface 30, the associated main flute 32 of the end gash 42 is the rotationally trailing main flute 32. Each end gash 42 can extend towards the mounting portion 24 and can interrupt at least two auxiliary flutes 34 on the peripheral surface 30. Optimally, each end gash 42 can interrupt exactly two auxiliary flutes 34 on the peripheral surface 30. Each of the end gashes 42 has a gash angle δ, defined between an imaginary line L which lies on the gash central surface 46 of each end gash 42, and the longitudinal axis A. In a particular application, optimal performance is attained when each gash angle δ is in the range 30°<δ<50°. Configuring the end gashes 42 to be configured and dimensioned as defined in the description hereinabove may advantageously provide improved evacuation of the debris that is produced from the workpiece during cutting operations.

As seen best in FIG. 4, in accordance with some embodiments of the subject matter of the present application, each of the main flutes 32 can open out to the end face surface 28 or one of the end gashes 42. Likewise, each of the auxiliary flutes 34 can open out to the end face surface 28 or one of the end gashes 42.

The cutting portion 22 includes a plurality of end face cutting teeth 48 formed on the end face surface 28. Each end face cutting tooth 48 is defined between circumferentially adjacent end gashes 42. Circumferentially adjacent end gashes 42 consist of a rotationally leading end gash 50 and a rotationally trailing end gash 52. Each end face cutting tooth 48 is defined axially at an end furthest from the mounting portion 24 by the end face surface 28. Moreover, each end face cutting tooth 48 is defined radially by circumferentially adjacent end gashes 42. More precisely, each end face cutting tooth 48 can be defined radially by the first gash side surface 44a of the rotationally leading end gash 50 and the second gash side surface 44b of the rotationally trailing end gash 52. Each end face cutting tooth 48 is defined peripherally by the peripheral surface 30 located between circumferentially adjacent end gashes 42.

Each end face cutting tooth 48 includes an end tooth major surface 54 that generally faces the direction of rotation R and which is formed by the rotationally leading one 50 of circumferentially adjacent end gashes 42. More precisely, the end tooth major surface 54 is formed by the first gash side surface 44a of the rotationally leading one 50 of circumferentially adjacent end gashes 42. The end tooth major surface 54 can be inclined with respect to the longitudinal axis A. This is known and is not part of the invention.

Each end face cutting tooth 48 has an end cutting edge 56 that is formed at an intersection of the end face surface 28 and the end tooth major surface 54. Each end cutting edge 56 has an end rake surface 62 located on the end tooth major surface 54 that extends away from the end cutting edge 56. Each end cutting edge 56 has an end primary relief surface 58 located on the end face surface 28 that extends away from the end cutting edge 56. In accordance with some embodiments of the subject matter of the present application, an end secondary relief surface 60 can be located on the end face surface 28 and can extend from the end primary relief surface 58 in a direction away from the end cutting edge 56. Each of the end primary relief surfaces 58 and, optionally, each of the end secondary relief surfaces 60 can be located on the end face sub-surfaces 28a, 28b, 28c, 28d, respectively.

Each end cutting edge 56 extends in a direction from a radially outer portion 66 of the cutting portion 22 to the radially inner portion 64 of the cutting portion 22, as seen in an end view of the rotary cutting tool 20 taken along the longitudinal axis A (i.e. FIG. 3). Stated differently, each end cutting edge 56 extends in the generally radial direction. It is noted that each end cutting edge 56 may not necessarily pass through the longitudinal axis A.

Each end cutting edge 56 can define a dish angle θ, as measured with respect to a dish plane P that is oriented perpendicularly to the longitudinal axis A. That is to say, each end cutting edge 56 is inclined so that its distance to the mounting portion 24 decreases as it extends towards the radially inner portion 64 of the cutting portion 22, as seen in a side view of the cutting portion 22 (i.e. FIG. 5).

Figure 7:
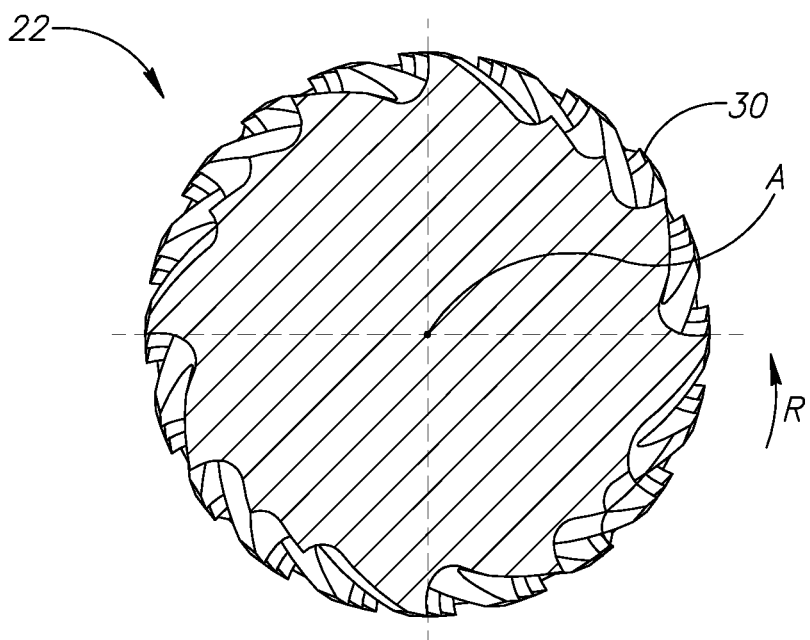
FIG. 7 is a cross sectional view of the cutting portion taken along the line VII-VII in FIG. 2.

Referring now to FIG. 7, in accordance with some embodiments of the subject matter of the present application, in each cross sectional view of the cutting portion 22, taken perpendicular to the longitudinal axis A, but not through the end gashes 42, the cutting portion 22 can exhibit N-fold rotational symmetry about the longitudinal axis A, where N is equal to the greatest common divisor of the number of main flutes 32 and the number of auxiliary flutes 34.

Figure 8:
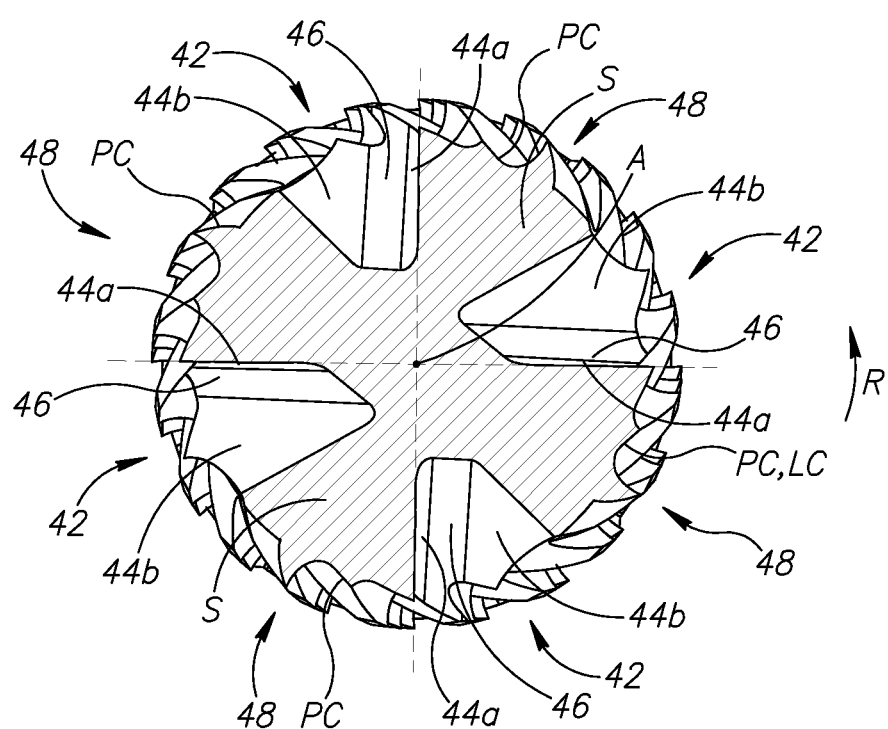
FIG. 8 is a cross sectional view of the cutting portion taken along the line VIII-VIII in FIG. 2.

Referring now to FIG. 8, in each cross sectional view of the cutting portion 22, taken perpendicular to the longitudinal axis A through the end gashes 42, a peripheral contour PC of the peripheral surface 30 of one end face cutting tooth 48 defines an imaginary contour line LC. It is noted that the peripheral contour PC is defined by the contour of the fluted peripheral surface 30 located between adjacent end gashes 42. The imaginary contour line LC is in rotationally aligned relationship, about the longitudinal axis A, with the peripheral contour PC of the peripheral surfaces 30 of all other end face cutting teeth 48. Thus, the peripheral surface 30 of one of the end face cutting teeth 48 is in rotationally aligned relationship, about the longitudinal axis A, with the peripheral surface 30 of all other end face cutting teeth 48.

In order to allow cutting operations in a partial axial direction, at least one of the end cutting edges 56 forms an extended end cutting edge 68 that extends to a radially central portion C of the cutting portion 22, as seen in an end view of the rotary cutting tool 20 taken along the longitudinal axis A (i.e. FIG. 3). In the case of an odd number of end face cutting teeth 48, one end cutting edge 56 forms an extended cutting edge 68. In the case of an even number of end face cutting teeth 48, two end cutting edges 56 form extended cutting edges 68. Thus, in accordance with some embodiments of the subject matter of the present application, referring now to FIG. 8, in each cross sectional view of the cutting portion 22 taken perpendicular to the longitudinal axis A through the end gashes 42, the cutting portion 22 can have X equal tooth sectors S, where X is equal to number of end face cutting teeth 48 minus the number of extended cutting edges 68. Stated differently, the cutting portion 22 can have X identical end gashes 42.

The number of main flutes 32 and auxiliary flutes 34 are different. The number of main and auxiliary flutes 32, 34 are each wholly divisible by, and greater than, the number of end face cutting teeth 48. In accordance with some embodiments of the subject matter of the present application, the number of end face cutting teeth 48 can be greater than or equal to 2 and less than or equal to 8. The number of main and auxiliary flutes 32, 34, respectively, can be greater than or equal to 4 and less than or equal to 24. The number of main flutes 32 can be greater than the number of auxiliary flutes 34. The number of main flutes 32 can be exactly three times the number of end face cutting teeth 48. The number of auxiliary flutes 34 can be exactly twice the number of end face cutting teeth 48. In a particular application, optimal performance is attained when the number of end face cutting teeth 48 is equal to 4, the number of main flutes 32 is equal to 12 and the number of auxiliary flutes 34 is equal to 8.

In accordance with some embodiments of the subject matter of the present application, the rotary cutting tool 20 can be a right handed rotary cutting tool, the main flutes 32 can be right handed helical flutes and the auxiliary flutes 34 can be left handed helical flutes. Alternatively, the rotary cutting tool 20 can be a left handed rotary cutting tool, the main flutes 32 can be left handed helical flutes, and the auxiliary flutes 34 can be right handed helical flutes.

It should be noted that a feature of the subject matter of the present application is that, when the rotary cutting tool 20 rotates about the longitudinal axis A, stable rotation is attained. This ensures that the peripheral cutting teeth 36, at a similar axial distance from the end face surface 28, wear out at substantially the same rate during rotary cutting operations, thus advantageously increasing the tool life of the rotary cutting tool 20.

Although the subject matter of the present application has been described to a certain degree of particularity, it should be understood that various alterations and modifications could be made without departing from the spirit or scope of the invention as hereinafter claimed.

What is claimed is:

1. A rotary cutting tool (20), having a longitudinal axis (A) about which the rotary cutting tool (20) is rotatable in a direction of rotation (R), the rotary cutting tool (20) comprising:

a cutting portion (22) and a mounting portion (24) extending therefrom, the cutting portion (22) comprising:

an end face surface (28), intersected by the longitudinal axis (A), and a peripheral surface (30) extending from the end face surface (28) towards the mounting portion (24), the peripheral surface (30) comprising respective pluralities of main and auxiliary flutes (32, 34) recessed therein that extend helically with opposite hand about the longitudinal axis (A);

a plurality of end face cutting teeth (48) formed on the end face surface (28), each end face cutting tooth (48) comprising an end tooth major surface (54) that generally faces the direction of rotation (R), and an end cutting edge (56) formed at the intersection of the end face surface (28) and the end tooth major surface (54), each end face cutting tooth (48) being defined between circumferentially adjacent end gashes (42), each of which end gashes (42) interrupts an intersection of the peripheral surface (30) with the end face surface (28) at an associated one of the plurality of main flutes (32); wherein the number of main flutes (32) and auxiliary flutes (34) are different, each being wholly divisible by, and greater than, the number of end face cutting teeth (48);

the end gashes (42) are evenly circumferentially distributed with respect to the main flutes (32); and in each cross sectional view of the cutting portion (22), taken perpendicular to the longitudinal axis (A) through the end gashes (42), an imaginary contour line (LC) defined by a peripheral contour (PC) of the peripheral surface (30) of one of the end face cutting teeth (48) is in rotationally aligned relationship, about the longitudinal axis (A), with the peripheral contour (PC) of the peripheral surfaces (30) of all other end face cutting teeth (48).

2. The rotary cutting tool (20), according to claim 1; wherein:
the main flutes (32) are equally spaced apart; and
the auxiliary flutes (34) are equally spaced apart.

3. The rotary cutting tool (20), according to claim 1, wherein each end gash (42) extends circumferentially along the intersection of the end face surface (28) and the peripheral surface (30), in the direction of rotation (R), and interrupts exactly two adjacent main flutes (32) along said intersection.

4. The rotary cutting tool (20), according to claim 1, wherein each end gash (42) extends towards the mounting portion (24) and interrupts at least two auxiliary flutes (34) on the peripheral surface (30).

5. The rotary cutting tool (20), according to claim 4, wherein each end gash (42) interrupts exactly two auxiliary flutes (34) on the peripheral surface (30).

6. The rotary cutting tool (20), according to claim 1, wherein:
each end face cutting tooth (48) is defined axially at an end furthest from the mounting portion (24) by the end face surface (28) and radially by circumferentially adjacent end gashes (42).

7. The rotary cutting tool (20), according to claim 1, wherein adjacent pairs of main and auxiliary flutes (32, 34) intersect on the peripheral surface (30) to form discrete peripheral cutting teeth (36).

8. The rotary cutting tool (20), according to claim 7, wherein each peripheral cutting tooth (36) comprises;
a main peripheral cutting edge (38) formed at the intersection of the peripheral surface (30) and the rotationally leading main flute (32) of the adjacent pair of main flutes (32); and
an auxiliary peripheral cutting edge (40) formed at the intersection of the peripheral surface (30) and the rotationally leading auxiliary flute (34) of the adjacent pair of auxiliary flutes (34).

9. The rotary cutting tool (20), according to claim 8, wherein a peripheral relief surface (41) extends between the main peripheral cutting edge (38) and the auxiliary peripheral cutting edge (40) on each peripheral cutting tooth (36).

10. The rotary cutting tool (20), according to claim 1, wherein the rotary cutting tool (20) is one selected from a group consisting of an end-mill cutter and a router bit.

11. The rotary cutting tool (20), according to claim 1, comprising a unitary integral one-piece construction.

12. The rotary cutting tool (20), according to claim 1, wherein in each cross sectional view of the cutting portion (22) taken perpendicular to the longitudinal axis (A) but not through the end gashes (42), the cutting portion (22) exhibits N-fold rotational symmetry about the longitudinal axis (A), where N is equal to the greatest common divisor of the number of main flutes (32) and the number of auxiliary flutes (34).

13. The rotary cutting tool (20), according to claim 1, wherein:
at least one of the end cutting edges (56) forms an extended end cutting edge (68) that extends to a radially central portion (C) of the cutting portion (22), as seen in an end view of the rotary cutting tool (20) taken along the longitudinal axis (A); and
in each cross sectional view of the cutting portion (22) taken perpendicular to the longitudinal axis (A) through the end gashes (42) the cutting portion (22) has X equal tooth sectors (S) where X is equal to number of end face cutting teeth (48) minus the number of extended cutting edges (68).

14. The rotary cutting tool (20), according to claim 13, wherein the cutting portion (22) exhibits 180° rotational symmetry about the longitudinal axis (A).

15. The rotary cutting tool (20), according to claim 1, wherein the number of main and auxiliary flutes (32, 34), respectively, are greater than or equal to 4 and less than or equal to 24.

16. The rotary cutting tool (20), according to claim 1, wherein the number of end face cutting teeth (48) is greater than or equal to 2 and less than or equal to 8.

17. The rotary cutting tool (20), according to claim 1, wherein the number of main flutes (32) is greater than the number of auxiliary flutes (34).

18. The rotary cutting tool (20), according to claim 1; wherein:
the number of main flutes (32) is exactly three times the number of end face cutting teeth (48); and
the number of auxiliary flutes (34) is exactly twice the number of end face cutting teeth (48).

19. The rotary cutting tool (20), according to claim 18; wherein:
the number of end face cutting teeth (48) is 4;
the number of main flutes (32) is 12; and
the number of auxiliary flutes (34) is 8.

20. The rotary cutting tool (20), according to claim 19; wherein:
the rotary cutting tool (20) is a right handed rotary cutting tool, the main flutes (32) are right handed helical flutes and the auxiliary flutes (34) are left handed helical flutes; or
the rotary cutting tool (20) is a left handed rotary cutting tool, the main flutes (32) are left handed helical flutes and the auxiliary flutes (34) are right handed helical flutes.

21. The rotary cutting tool (20), according to claim 1, wherein the cutting portion (22) is generally cylindrical.

22. The rotary cutting tool (20), according to claim 1, wherein:
all the main flutes (32) are helically aligned about the longitudinal axis (A) with a main flute helix (H1) having a main flute helix angle $\alpha$;
all the auxiliary flutes (34) are helically aligned about the longitudinal axis (A) with an auxiliary flute helix (H2) having an auxiliary flute helix angle $\beta$; and
the main flute helix angle $\alpha$ is less than the auxiliary flute helix angle $\beta$ in absolute value.

23. The rotary cutting tool (20), according to claim 1, wherein the mounting portion (24) comprises a threaded portion (26).

24. The rotary cutting tool (20), according to claim 1, wherein in each cross sectional view of the cutting portion (22) taken perpendicular to the longitudinal axis (A), all the main flutes (32) have an equal main flute depth (D1), as measured in the radial direction.

25. The rotary cutting tool (20), according to claim 1, wherein each of the main flutes (32) and each of the auxiliary flutes (34) open out to the end face surface (28) or to one of the end gashes (42).

26. The rotary cutting tool (20), according to claim 1, wherein each of the end gashes (42) has a gash angle $\delta$, each gash angle $\delta$ being in the range $30° < \delta < 50°$.

27. The rotary cutting tool (20), according to claim 1, wherein each end cutting edge (56) defines a dish angle ($\theta$), as measured with respect to a dish plane (P) that is oriented perpendicularly to the longitudinal axis (A).

28. The rotary cutting tool (20), according to claim 1, wherein the auxiliary core diameter ($CD_A$) defined by the auxiliary flutes (34) is greater than the main core diameter ($CD_M$) defined by the main flutes (32).

29. A rotary cutting tool (20), having a longitudinal axis (A) about which the rotary cutting tool (20) is rotatable in a direction of rotation (R), the rotary cutting tool (20) comprising:
- a cutting portion (22) and a mounting portion (24) extending therefrom, the cutting portion (22) comprising:
  - an end face surface (28), intersected by the longitudinal axis (A), and a peripheral surface (30) extending from the end face surface (28) towards the mounting portion (24), the peripheral surface (30) comprising respective pluralities of equally spaced apart main and equally spaced apart auxiliary flutes (32, 34) recessed therein that extend helically with opposite hand about the longitudinal axis (A);
  - a plurality of end face cutting teeth (48) formed on the end face surface (28), each end face cutting tooth (48) comprising an end tooth major surface (54) that generally faces the direction of rotation (R), and an end cutting edge (56) formed at the intersection of the end face surface (28) and the end tooth major surface (54), each end face cutting tooth (48) being defined between circumferentially adjacent end gashes (42), each of which end gashes (42) interrupts an intersection of the peripheral surface (30) with the end face surface (28) at an associated one of the plurality of main flutes (32); wherein
  - the number of main flutes (32) and auxiliary flutes (34) are different, each being wholly divisible by, and greater than, the number of end face cutting teeth (48); and
  - the end gashes (42) are evenly circumferentially distributed with respect to the main flutes (32).

\* \* \* \* \*